United States Patent Office 3,466,482
Patented Sept. 9, 1969

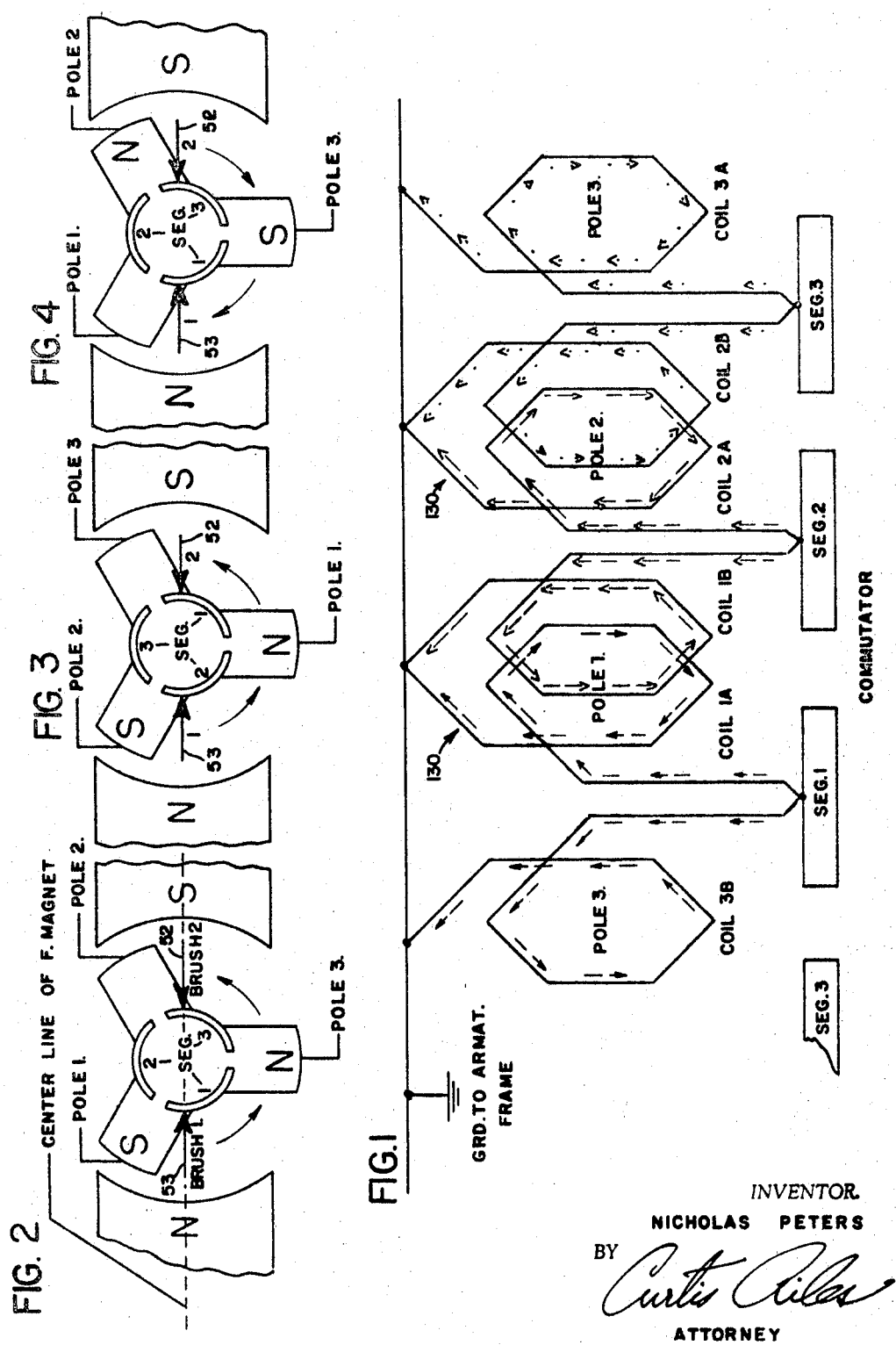

3,466,482
REVERSIBLE DIRECT CURRENT MOTOR
Nicholas Peters, 3399 Lorelei Drive,
Yorktown Heights, N.Y. 10598
Original application Aug. 22, 1963, Ser. No. 303,758, now Patent No. 3,376,575, dated Apr. 2, 1968. Divided and this application Sept. 13, 1967, Ser. No. 667,571
Int. Cl. H02k 1/24
U.S. Cl. 310—269         3 Claims

ABSTRACT OF THE DISCLOSURE

The motor (FIG. 6) has two permanent magnet stator poles and a three pole armature with a three segment commutator and two commutator brushes 52 and 53 (FIG. 7). Each armature pole has at least one winding 131 connected from an associated commutator segment to ground. Application of a D.C. current source between one brush 52 and ground causes motor rotation in one direction. Application of current at the other brush 53 provides rotation in the other direction.

Cross references to related applications

This application is a division of U.S. application Ser. No. 303,758, filed Aug. 22, 1963 now Patent No. 3,376,-575 issued Apr. 2, 1968, for Continuous Remote Control Radio System.

Background of the invention

The parent application describes a control system useful for vehicles such as airplanes which may be operated by radio signals. The present invention relates to reversible D.C. motors which are particularly useful in such systems, but which may have other uses as well.

An object of the invention is the provision of novel and improved reversible D.C. motors.

The above as well as additional objects will become apparent in the following description.

Brief Description of the drawings

FIG. 1 is a schematic diagram of the armature winding of one form of reversible permanent magnet D.C. motor in accordance with the present invention.

FIGS. 2, 3, and 4 are schematic views illustrating the operation of the motor of FIG. 1.

Description of the preferred embodiments

Figure 6:
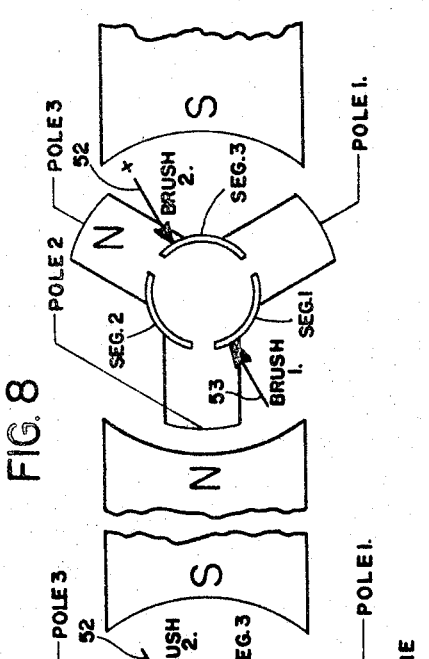
FIGS. 6, 7, and 8 are schematic views illustrating the operation of the other form of the motor.

FIGS. 1-4 illustrate schematically a reversible permanent magnet D.C. motor which is provided with two terminals and a grounded armature frame. The arrows 52 and 53 in FIGS. 2-4 represent commutator brushes. This type of motor may be termed a "split wound armature" motor, which, when unidirectional current is sent through one brush or terminal 52 to ground, rotates in one direction, and when the current is sent through the other brush or terminal 53 to ground, rotates in the opposite direction.

The armature winding diagram of FIG. 1 shows that each of the three poles of the armature, designated poles #1, #2, and #3, has a continuous two-turn coil 130 wound thereon, and that each such coil has its midpoint grounded to the armature frame thus dividing or "splitting" it into two separate coils of equal length extending from the grounded point in mutually opposite directions. Thus pole #1 has oppositely wound coils 1A and 1B, pole #2 has similar coils 2A and 2B, and pole #3 has similar coils 3A and 3B. The ends of the coils 130 are connected to successively adjacent commutator segments. Coil 1A is connected to commutator segment #1, coil 1B is connected to segment #2, coil 2A is connected to segment #2, coil 2B is connected to segment #3, coil 3A is connected to segment #3, and coil 3B is connected to segment #1. In actual practice, a larger predetermined number of turns in the split coils 130 are used on each armature pole; for example, in one practical embodiment such coils have fifty-five turns. The two brushes #1 and #2 in FIGS. 2-4 lie in a common plane through the median lines of the north (N) and south (S) poles of the permanent magnet stator.

When positive voltage is applied to brush #1, FIG. 2, which is making contact with commutator segment #1 (brush #2 being inactive), current flow is through coil 3B of pole #3 and through coil 1A of pole #1 as indicated by dashed arrows in FIG. 1. This flow at coil 3B creates a north magnetic field at pole #3, and the flow in coil 1A creates a south magnetic field at pole #1, whence, FIG. 2, pole #2 is attracted to the north stator magnet pole and pole #3 is attracted to the south stator magnet pole, to turn the armature counterclockwise, FIG. 2. As the armature continues to turn in this direction, commutator segment #1 passes from under brush #1, and segment #2 now makes contact with brush #1, FIG. 3. Now the current flow is through coil 1B and coil 2A as indicated by broken arrows, FIG. 1, thus creating a south magnetic field at pole #2 and a north field at pole #1, hence continuing counterclockwise rotation, FIG. 3, and so on.

To reverse the direction of rotation of the armature, the positive of the power supply is directed to brush #2 so that brush #1 is now inactive, FIG. 4. Current flow now is from commutator segment #3, through coils 3A and 2B, indicated by dotted arrows, FIG. 1. This creates a north magnetic field at pole #2 and a south field at pole #3, turning the armature clockwise, and so on.

An added feature of the split wound armature motor is that when one brush has a positive voltage applied thereto to turn the motor in one direction, the other inactive brush may be used to tap current from the armature through ground, as the armature would serve as a generator through the inactive brush. Hence when such motor is used in servo mechanisms it can generate voltage and through a feed-back system. The generated current can be used to damp the motor.

Figure 5:
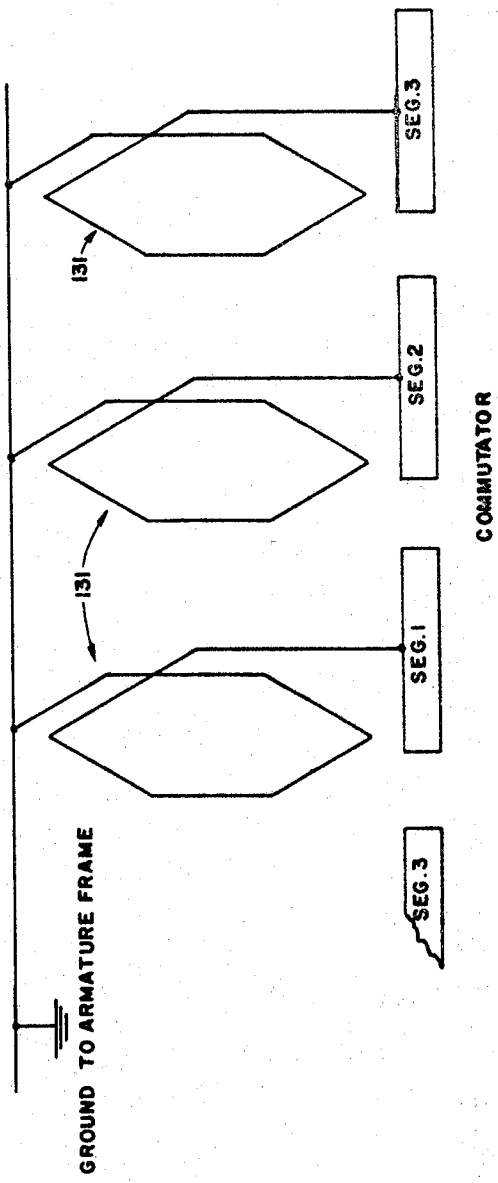
FIG. 5 is a schematic diagram of the armature winding of another form of such a motor in accordance with the invention.

A modified type of permanent magnet D.C. motor whose direction of rotation is reversed by sending unidirectional current through one terminal or the other to ground, is illustrated in FIGS. 5-8. FIG. 5 is an armature winding diagram of this type, wherein the three identical coils 131 are wound about the three armature poles #1, #2, and #3 in the same electrical direction, each coil having one end grounded to the armature frame and the other end connected to one of the three commutator segments #1, #2, and #3, in the manner shown. In FIG. 6, the manner of showing the winding of the coils on the armature poles is intended solely for the purpose of indicating that the coils are all wound in the same electrical direction.

A feature of this modified type of motor is a low current drain per running volt, as it has only one active armature pole except for an instant when two commutator segments are making contact with a brush while one is just passing from under the brush. However, this motor supplies only one-half the torque delivered by the split wound armature motor.

Figure 7:
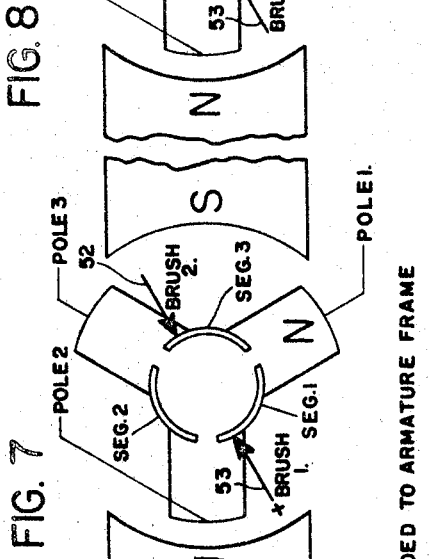
Figure 8:
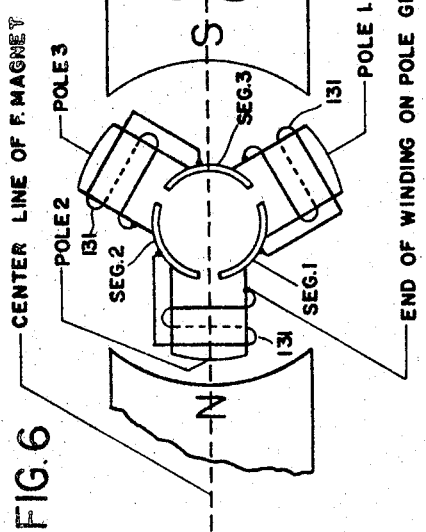

FIGS. 7 and 8 show that the two brushes of this modified motor are offset from the center line of the field magnets by an angle, substantially fifteen degrees, so that the armature will not lock in position. For example, in FIG. 7, the two brushes would, if in the plane of the said center line, cause pole #2 to lock, when aligned with the center line of the north field magnet, to the north field magnet if brush #1 were also on the same center line.

As shown in FIG. 7, assuming a positive voltage applied to brush #1 which makes contact with commutator segment #1, a north magnetic field is created in pole #1, attracting it to the south field magnet, thus turning the armature counterclockwise. In FIG. 8, it is assumed that the voltage is applied to brush #2, whence the armature rotates clockwise. With brush #2 contacting segment #3 a north field is produced in pole #3, attracting the pole to the south field magnet. In both FIGS. 7 and 8 a constant direction of rotation continues with each successive pole as the armature turns.

It is to be noted that in this modified type of motor the field created by the winding of the armature is always a north field, and that there is no change of direction of the current in the armature as was the case with the split wound armature motor. In the modified type the motor is reversed by the activated pole in its relation to the permanent field magnets, i.e., the permanent magnetic field. For example, in FIG. 7 only pole #1 is activated and is attracted to the south field magnet, while in FIG. 8 only pole #3 is activated and is attracted to the south field magnet.

Either of the two types of reversible D.C. motor illustrated and described may be used in the radio control system disclosed in the parent patent application Ser. No. 303,758, and both types are adaptable for other uses as well.

While the invention has been described with particular reference to the embodiments illustrated in the drawings, such is not to be construed as a limitation upon the invention which is best defined in the appended claims.

I claim:
1. A reversible D.C. motor having two opposed permanent magnets providing the magnetic field therefor and a three-pole grounded armature provided with a commutator having three segments, the armature poles having windings thereon, the motor having two diametrically opposed brushes and two terminals, each terminal being connected to one of the brushes, each winding having one end thereof grounded to the armature and having the other end thereof secured to a commutator segment whereby minal to ground the armature rotates in one direction and when said current is passed through the other terminal to ground the armature rotates in the opposite direction.

2. A reversible D.C. motor according to claim 1, wherein said windings are six in number and of an equal number of turns, each armature pole having two of the windings thereon extending in mutually opposite electrical directions, the electrically mutually adjacent ends of the two windings on an armature pole being joined and constituting said end which is grounded to the armature, the other ends of the said two windings on each armature pole being connected to mutually circumferentially adjacent commutator segments.

3. A reversible D.C. motor according to claim 1, wherein said windings are three in number and of an equal number of turns and each of the windings is wound on one of the armature poles, all of the three windings being wound in the same electrical direction.

References Cited
UNITED STATES PATENTS 2,838,724   6/1958   Ecary _____ 318—292

ORIS L. RADER, Primary Examiner
K. L. CROSSON, Assistant Examiner

U.S. Cl. X.R.
310—177; 318—292

UNITED STATES PATENT OFFICE
CERTIFICATE OF CORRECTION

Patent No. 3,466,482        Dated September 9, 1969

Inventor(s) NICHOLAS PETERS

It is certified that error appears in the above-identified patent and that said Letters Patent are hereby corrected as shown below:

Column 2, line 22, "pole #2" should read --pole #1--.
Column 4, after line 10 and before line 11, insert --when unidirectional current is passed through one ter- --.

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents